(12) United States Patent
Goo et al.

(10) Patent No.: US 10,435,032 B2
(45) Date of Patent: Oct. 8, 2019

(54) VEHICLE AND METHOD FOR CONTROLLING THE SAME

(71) Applicant: Hyundai Motor Company, Seoul (KR)

(72) Inventors: Ja Yoon Goo, Ulsan (KR); Ki Beom Kwon, Seoul (KR); Chang Jae Lee, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/374,746

(22) Filed: Dec. 9, 2016

(65) Prior Publication Data
US 2017/0369076 A1 Dec. 28, 2017

(30) Foreign Application Priority Data

Jun. 24, 2016 (KR) ........................ 10-2016-0079111

(51) Int. Cl.
*B60W 50/08* (2012.01)
*B60W 30/182* (2012.01)
(Continued)

(52) U.S. Cl.
CPC ....... *B60W 50/082* (2013.01); *B60G 17/0195* (2013.01); *B60G 17/06* (2013.01); *B60K 37/02* (2013.01); *B60W 10/04* (2013.01); *B60W 10/22* (2013.01); *B60W 30/182* (2013.01); *B60W 40/09* (2013.01); *B60G 2400/204* (2013.01); *B60G 2400/33* (2013.01); *B60G 2400/39* (2013.01); *B60G 2400/40* (2013.01); *B60G 2500/10* (2013.01); *B60W 30/09* (2013.01);
(Continued)

(58) Field of Classification Search
None
See application file for complete search history.

(56) References Cited

U.S. PATENT DOCUMENTS 5,776,031 A * 7/1998 Minowa ............... B60K 28/165
477/143
6,757,606 B1 * 6/2004 Gonring .............. F02D 41/2422
123/406.23

(Continued)

FOREIGN PATENT DOCUMENTS

KR 10-2006-0021452 3/2006
KR 10-2011-0073233 6/2011
(Continued)

OTHER PUBLICATIONS

Audi Drive Select: Overview for A3 & S3, hereinafter referred to as "ADS", published on the internet as a YouTube link on Jan. 3, 2015 (https://www.youtube.com/watch?v=FmMgeEPm2u4) (Year: 2015).*
(Continued)

*Primary Examiner* — Navid Ziaeianmehdizadeh
(74) *Attorney, Agent, or Firm* — Brinks Gilson & Lione

(57) ABSTRACT

The present disclosure provides a vehicle and method for controlling the same. The vehicle includes: an input unit configured to receive a command to select a traveling mode; a controller configured to determine an Advanced Driver Assistance System (ADAS) setting parameter based on a traveling mode selected through the input unit and a driving pattern of a driver; and a display configured to display setting information regarding the determined ADAS setting parameter.

18 Claims, 9 Drawing Sheets

(51) Int. Cl.
*B60W 40/09* (2012.01)
*B60W 50/00* (2006.01)
*B60G 17/0195* (2006.01)
*B60K 37/02* (2006.01)
*B60G 17/06* (2006.01)
*B60W 10/04* (2006.01)
*B60W 10/22* (2006.01)
*B60W 30/09* (2012.01)
*B60W 30/12* (2006.01)
*B60W 30/16* (2012.01)
*B60W 50/14* (2012.01)
*B60W 30/14* (2006.01)

(52) U.S. Cl.
CPC ........... *B60W 30/12* (2013.01); *B60W 30/143* (2013.01); *B60W 30/16* (2013.01); *B60W 50/14* (2013.01); *B60W 2050/0088* (2013.01); *B60W 2050/146* (2013.01); *B60W 2510/20* (2013.01); *B60W 2520/10* (2013.01); *B60W 2540/10* (2013.01); *B60W 2540/12* (2013.01); *B60W 2540/18* (2013.01); *B60W 2540/30* (2013.01); *B60W 2720/106* (2013.01); *B60W 2750/308* (2013.01)

(56) References Cited

U.S. PATENT DOCUMENTS

| | | | | |
|---|---|---|---|---|
| 8,311,722 | B2* | 11/2012 | Zhang | B60W 40/09 701/104 |
| 8,352,150 | B2* | 1/2013 | Hijikata | F02D 11/105 701/102 |
| 9,682,653 | B2* | 6/2017 | Oh | B60R 1/00 |
| 2008/0015768 | A1* | 1/2008 | Masuda | B60W 30/182 701/99 |
| 2009/0099727 | A1* | 4/2009 | Ghoneim | B60W 40/08 701/36 |
| 2012/0078467 | A1 | 3/2012 | Schweikl et al. | |
| 2012/0203399 | A1* | 8/2012 | Filev | B60W 30/02 701/1 |
| 2015/0073658 | A1* | 3/2015 | Stoof | B60G 17/06 701/37 |
| 2015/0112577 | A1* | 4/2015 | Velusamy | F02D 41/2422 701/110 |
| 2015/0336586 | A1* | 11/2015 | Choi | B60R 16/0236 340/425.5 |
| 2016/0082965 | A1* | 3/2016 | Jeon | B60W 30/182 701/36 |
| 2017/0096145 | A1* | 4/2017 | Bahn | E05F 15/70 |
| 2017/0113686 | A1* | 4/2017 | Horita | B60W 50/14 |
| 2017/0313323 | A1* | 11/2017 | Tseng | B60K 35/00 |

FOREIGN PATENT DOCUMENTS

| | | |
|---|---|---|
| KR | 20140060897 A | 5/2014 |
| KR | 20140085143 A | 7/2014 |
| KR | 101459473 B1 | 11/2014 |
| KR | 10-1484249 | 1/2015 |
| KR | 10-1555444 | 9/2015 |

OTHER PUBLICATIONS

Owner's Manual of 2015 Audi A3 Sedan/S3 Sedan, hereinafter referred to as "Audi Manual" (Year: 2015).*
Notice of Allowance for Korean Application No. 10-2016-0079111 dated Nov. 21, 2017 (1 page).

\* cited by examiner

FIG. 4

| B1 | -5 | -4 | -3 | -2 | -1 | 0 | +1 | +2 | +3 | +4 | +5 |
|----|----|----|----|----|----|----|----|----|----|----|----|
| B2 | -5 | -4 | -3 | -2 | -1 | 0 | +1 | +2 | +3 | +4 | +5 |

| ADAS MODE | | AEB/FCW | LDW/LKA | BSD | SCC | |
|---|---|---|---|---|---|---|
| | | | | | ACCELERATION | INTER-VEHICLE DISTANCE |
| FIRST ADAS MODE | SWAGGER | SLOW | WARNING | SLOW | FAST | SHORT |
| | USUAL | USUAL | REPULSIVE CONTROL | USUAL | USUAL | USUAL |
| SECOND ADAS MODE | DESTRESS | FAST | REPULSIVE CONTROL | USUAL | SLOW | LONG |
| | NERVOUS | FAST | TRACKING CONTROL | FAST | SLOW | LONG |

FIG. 6

| A | ECO (A3) | | SMART (A1) | | | | SPORT (A2) | |
|---|---|---|---|---|---|---|---|---|
| B | −↙ | +↘ | DETERMINED BY VALUE B | | | | −↙ | +↘ |
| C | N | D | N | D | U | S | U | S |

VEHICLE AND METHOD FOR CONTROLLING THE SAME

CROSS REFERENCE TO RELATED APPLICATIONS

This application claims priority to and the benefit of Korean Patent Application No. 10-2016-0079111, filed on Jun. 24, 2016, which is hereby incorporated by reference in its entirety.

FIELD

The present disclosure relates to a vehicle equipped with an Advanced Driver Assist System (ADAS) and a method for controlling the vehicle.

BACKGROUND

The statements in this section merely provide background information related to the present disclosure and may not constitute prior art.

With technological developments, vehicles have been advanced to offer various functions to the driver. Especially, with the trend of replacing mechanical parts of the vehicle by electronic parts, there emerges a vehicle equipped with an Active Safety System (ASS) to avoid car accidents when the vehicle is on the verge or in the moment of the accident.

Furthermore, recent studies on vehicles equipped with an Advanced Driver Assist System (ADAS) that actively provides information about a state of the vehicle, a state of the driver, and surrounding conditions are ongoing actively.

Further areas of applicability will become apparent from the description provided herein. It should be understood that the description and specific examples are intended for purposes of illustration only and are not intended to limit the scope of the present disclosure.

SUMMARY

The present disclosure provides a vehicle and method for controlling the same, whereby controlling an Advanced Driver Assist System (ADAS) module based on a driving pattern of a driver and a traveling mode selected by an input.

According to one form, a vehicle may include: an input unit configured to receive a command to select a traveling mode; a controller configured to determine an Advanced Driver Assistance System (ADAS) setting parameter based on a traveling mode selected through the input unit and a driving pattern of a driver; and a display configured to display setting information regarding the determined ADAS setting parameter.

The controller may be configured to determine a traveling parameter based on the selected traveling mode.

The vehicle may further include: a driving unit configured to provide power to move the vehicle; and a suspension system configured to absorb external force applied during traveling, wherein the controller is configured to control the driving unit and the suspension system according to the determined traveling parameter.

The vehicle may further include: a sensor unit configured to detect traveling information, wherein the controller is configured to determine the driving pattern of the driver based on the detected traveling information.

The sensor unit may be configured to detect the traveling information based on at least one of a position of an accelerator pedal, a position of a brake pedal, a traveling speed, or a steering angle.

The controller may be configured to determine the ADAS setting parameter including at least one of a point of warning of collision with an object ahead, a point of deceleration to avoid collision with the object ahead, a method for preventing lane departure, a point of warning of collision with an object behind or to a side of the vehicle, time for acceleration to a target speed, or a safety distance to a vehicle ahead.

The controller may be configured to select one of a plurality of ADAS modes based on the traveling mode and the driving pattern of the driver, and determine the ADAS setting parameter corresponding to the selected ADAS mode.

The controller may be configured to select one of first ADAS modes corresponding to a first traveling mode according to the driving pattern of the driver, when the first traveling mode is selected.

The controller may be configured to select one of second ADAS modes corresponding to a second traveling mode according to the driving pattern of the driver, when the second traveling mode is selected.

The vehicle may further include: at least one ADAS module according to the determined ADAS setting parameter.

According to another form, the present disclosure provides a method for controlling a vehicle. The method may include: receiving a command to select a traveling mode; determining a driving pattern of a driver; determining an Advanced Driver Assistance System (ADAS) setting parameter based on the selected traveling mode and the driving pattern of the driver; and displaying setting information regarding the determined ADAS setting parameter.

The method may further include: determining a traveling parameter based on the selected traveling mode.

The method may further include: performing at least one of operations of providing power to move the vehicle according to the determined traveling parameter or absorbing external force applied during traveling according to the determined traveling parameter.

The determining the driving pattern of the driver may include: detecting traveling information; and determining the driving pattern of the driver based on the detected traveling information.

The detecting the traveling information may include: detecting the traveling information including at least one of a position of an accelerator pedal, a position of a brake pedal, a traveling speed, or a steering angle.

The determining the ADAS setting parameter may include: determining the ADAS setting parameter including at least one of a point of warning of collision with an object ahead, a point of deceleration to avoid collision with the object ahead, a method for preventing lane departure, a point of warning of collision with an object behind or to a side of the vehicle, time for acceleration to a target speed, or a safety distance to a vehicle ahead.

The determining the ADAS setting parameter may include: selecting one of a plurality of ADAS modes based on the traveling mode and the driving pattern of the driver; and determining the ADAS setting parameter corresponding to the selected ADAS mode.

The selecting one of a plurality of ADAS modes may include: selecting one of first ADAS modes that corresponds to a first traveling mode according to the driving pattern of the driver, when the first traveling mode is selected.

The selecting one of a plurality of ADAS modes may include: selecting one of second ADAS modes that corresponds to a second traveling mode according to the driving pattern of the driver, when the second traveling mode is selected.

The method may further include: traveling according to the determined ADAS setting parameter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 shows how a controller determines a driving pattern of a driver;

FIG. 5 illustrates the relations between ADAS modes and ADAS setting parameters;

FIG. 6 illustrates how a controller determines the ADAS setting parameters;

Figure 1:
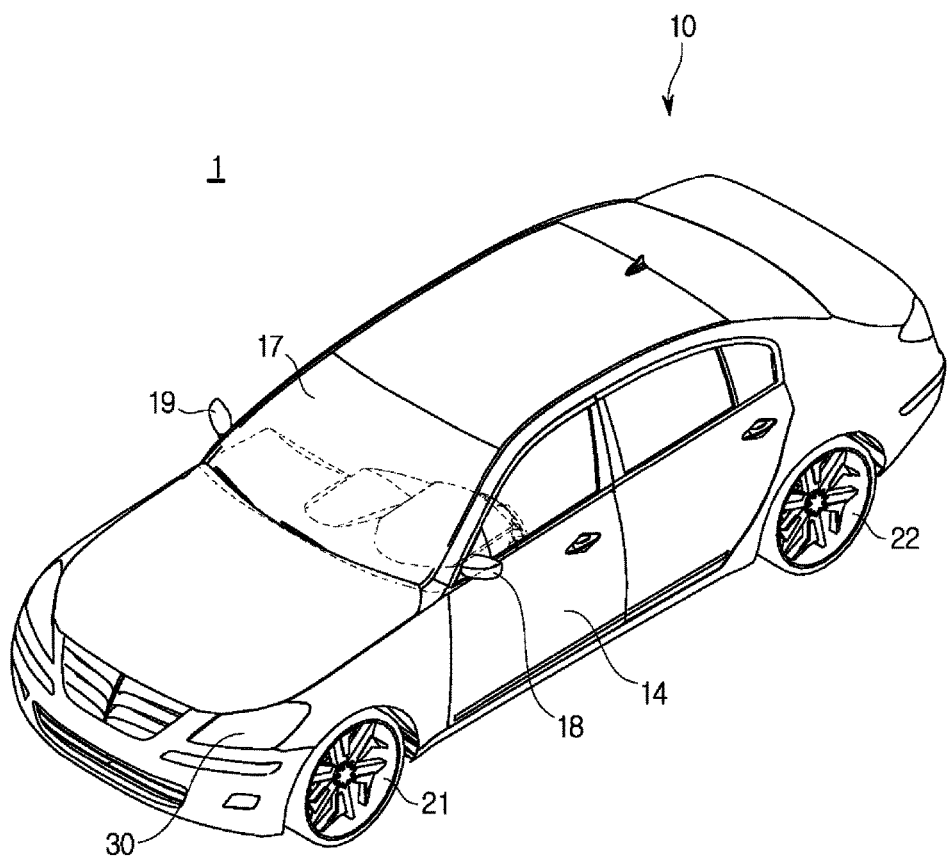
FIG. 1 shows the exterior of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
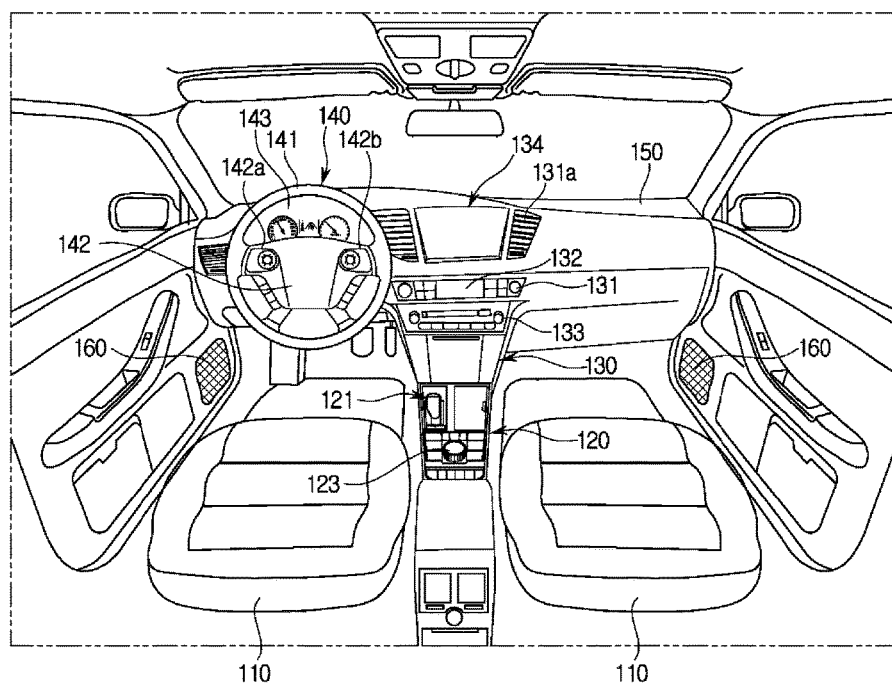
FIG. 2 illustrates internal features of a vehicle.
Figure 3:
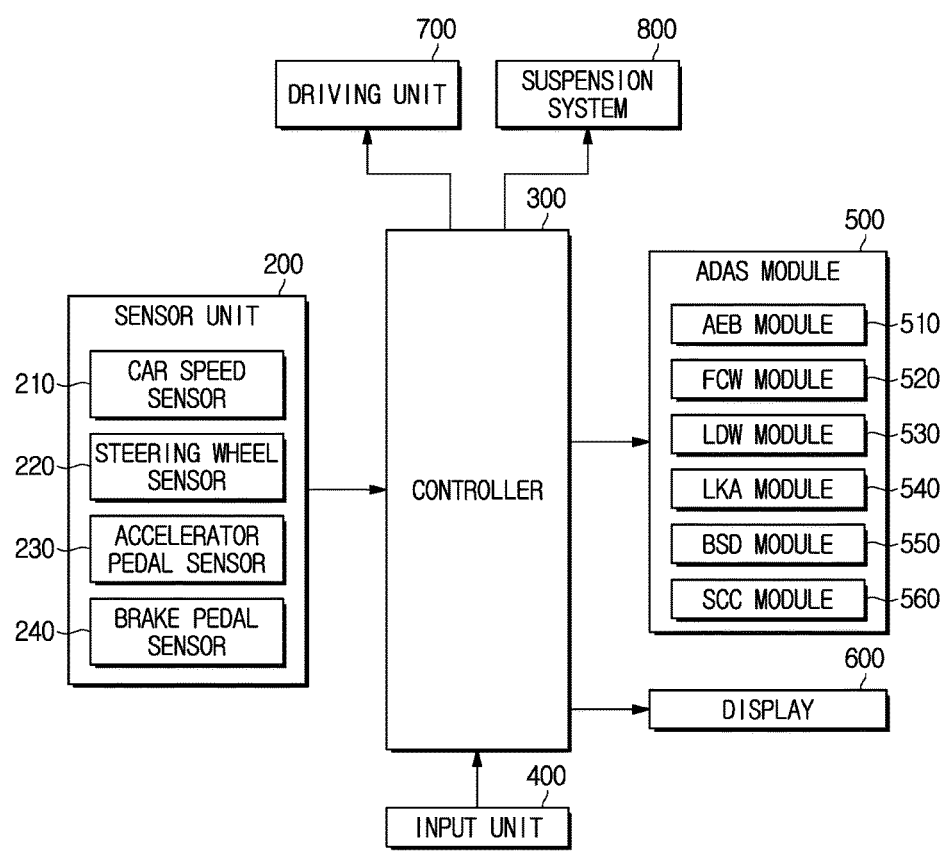
FIG. 3 is a block diagram of a vehicle equipped with an ADAS.

FIG. 1 shows the exterior of a vehicle, according to one form of the present disclosure, FIG. 2 illustrates internal features of a vehicle, according to one form of the present disclosure, and FIG. 3 is a block diagram of a vehicle equipped with an ADAS, according to one form of the present disclosure.

Referring to FIG. 1, a vehicle 1 includes main body 10 that forms the exterior of the vehicle 1, wheels 21 and 22 for moving the vehicle 1, doors 14 for shielding the interior of the vehicle 1 from the outside, a front window 17 through which the driver can see a view ahead of the vehicle 1, and side mirrors 18, 19 for helping the driver see areas behind and to the sides of the vehicle 1.

The wheels 21 and 22 include front wheels 21 equipped on the front side of the vehicle 1 and rear wheels 22 equipped on the rear side of the vehicle 1, and the front wheels 21 or rear wheels 22 may move the main body 10 forward or backward with turning force provided from a driving unit 700, which will be described later.

The doors 14 are attached onto the left and right sides of the main body 10, and opened for the driver to enter and exit the vehicle 1 and closed for shielding the interior of the vehicle 1 from the outside.

The front glass 17, also termed as a windshield glass, is placed on the top front of the main body 10 for securing a front view for the driver inside the vehicle 1.

The side mirrors 18 and 19 include a left side mirror 18 and a right side mirror 19 placed on the left and right sides of the main body 10, respectively, for helping the driver obtain views behind and to the sides of the vehicle 1.

FIG. 2 shows internal features of a vehicle, according to one form of the present disclosure;

Referring to FIG. 2, the vehicle 1 may include seats 110 reserved for driver and passengers to sit on, and a dashboard 150 having a gear box 120, a center fascia 130 and a steering wheel 140.

In the gear box 120, a gearshift 124 for shifting gears of the vehicle 1, and a dial controller 122 for controlling functions of the vehicle 1 may be installed, The steering wheel 140 equipped on the dashboard 150 is a tool to control a traveling direction of the vehicle 1, and may include a rim 141 to be held by the driver and a spoke 142 connected to a steering system of the vehicle 1 for connecting the rim 141 to a hub of a rotation shaft for steering. In one form of the present disclosure, control devices 142a, 142b may be formed on the spoke 142 to control various devices in the vehicle 1, e.g., the audio system.

A cluster 143 may have a speed gauge to indicate speed of the vehicle and an rpm gauge to indicate rpm of the vehicle. The user may check the whole information relating to the vehicle 1. The cluster 143 may also indicate information about the vehicle 1, especially, about traveling of the vehicle 1. For example, the cluster 143 may indicate an available distance to travel based on the remaining amount of fuel, information of a Global Positioning System (GPS) 134, audio information, and/or the like.

In order for the driver to check the vehicle-related information without excessively turning his/her eyes away from the forward direction while driving, the cluster 143 may be equipped in an area of the dashboard 150 to face the steering wheel 140.

Although not shown, a Head Up Display (HUD) for displaying visual information to be provided for the driver may also be equipped on the dashboard 150, In the center fascia 130 arranged on the dashboard 150, an air conditioner 131, a clock 132, an audio system 133, and the GPS 134 may be installed, The air conditioner 131 keeps the atmosphere inside the vehicle 1 pleasant by controlling temperature, humidity, air cleanness, and air flows inside the vehicle 1. The air conditioner 131 may include at least one vent 131a installed in the center fascia 130 for venting air. There may also be buttons or dials installed in the center fascia 130 to control e.g., the air conditioner 131. A person in the vehicle 1, e.g., the driver, may control the air conditioner 131 with the buttons arranged on the center fascia 130.

The clock 132 may be arranged around the buttons or dials for controlling the air conditioner 131.

The audio system 133 may include a control panel on which a number of buttons are arranged to perform functions of the audio system 133. The audio system 133 may provide a radio mode for radio listening and a media mode for reproducing audio files stored in various storage media.

The GPS 134 may match the coordinates of a location of the vehicle determined by satellite signals onto a map stored in advance, and display the result. For this, the UPS 134 may include a GPS antenna for receiving satellite signals, and a UPS display 600 for displaying the location of the vehicle matched onto the map.

Furthermore, the dashboard 150 may further include various instrument panels to indicate traveling speed of the vehicle 1, engine rpm, fuel gauge, or the like, and a glove box for containing various things.

In the meantime, the vehicle 1 as described in connection with FIGS. 1 and 2 may be equipped with an Advanced Driver Assist System (ADAS). The term ADAS may refer to a system to provide information about a state of the vehicle 1, a state of the driver, and/or a surrounding condition, or to actively control the vehicle 1.

The vehicle 1 equipped with the ADAS may operate according to a predetermined ADAS control logic. The term ADAS control logic may refer to a software algorithm or a logic circuit designed in hardware, which is determined in the manufacturing stage for normal operation.

The predetermined ADAS control logic may include at least one setting parameter. The parameter may refer to an ADAS control logic attribute whose value is determined by an input from the driver.

The present disclosure provides a vehicle and method for controlling the same, whereby determining ADAS setting parameters based on a driving pattern of a driver and a traveling mode selected by an input. This will now be described in detail.

Referring to FIG. 3, the vehicle 1 in accordance with one form of the present disclosure may include a driving unit 700 configured to provide power to move the vehicle; a suspension system 800 configured to absorb external force applied during traveling; an input unit 400 configured to receive a command to select a traveling mode; a sensor unit 200 configured to detect a traveling information; an ADAS module 500 equipped with ADAS functions; a controller 300 configured to determine an ADAS setting parameter based on the driving pattern which is determined by the detected traveling information and the selected traveling mode; and a display 600 configured to display setting information regarding the determined ADAS setting parameter.

The ADAS module 500 may include at least one module that implements at least one ADAS function. Specifically, the ADAS module 500 may include an Advanced Emergency Breaking (AEB) module 510 equipped with the AEB for automatic deceleration to prevent a possibility of collision with a vehicle ahead; a Forward Collision Warning (FCW) module 520 equipped with the FCW to warn the person in the vehicle 1, including the driver, of the possibility of collision with the vehicle ahead; a Lane Departure Warning (LDW) module 530 equipped with the LDW to warn a person in the vehicle 1, including the driver, of lane departure; a Lane Keeping Assist (LKA) module 540 equipped with the LKA to prevent departure of the current lane; a Blind Spot Detection (BSD) module 550 equipped with the BSD to prevent risks of traffic accidents; and a Smart Cruise Control (SCC) module 560 equipped with the SCC to automatically accelerate or decelerate the vehicle 1 depending on a distance to the vehicle ahead. Although not shown in FIG. 3, the ADAS module 500 may further include a Rear-end Collision Warning (RCW) module equipped with the RCW to warn a person in the vehicle 1, including the driver, of possible collision with a vehicle behind the vehicle 1.

The driving unit 700 may provide turning force to the front or rear wheels 21 or 22 of the vehicle 1 to move forward or backward. For example, the driving unit 700 employs a front-wheel driving method to provide turning force to the front wheels 21 in FIG. 1.

The driving unit 700 may employ an internal-combustion engine that burns a fossil fuel like oil to generate the turning force, or alternatively, may be implemented by a motor that uses power received from a fuel cell system to generate turning force.

The suspension system 800 is a salvage device of the vehicle 1 to connect between the main body and the wheels 21, 22, for absorbing shocks transferred from a road surface to the main body due to irregularities of the road surface and giving the driver pleasure of driving by controlling movements of the main body. The suspension system 800 may also give steering stability for the driver to move the vehicle 1 as the driver intends while internal force and/or external force is applied to the vehicle 1 due to driving, braking, turning, etc., of the vehicle 1.

The suspension system 800 may be electrically controlled by a controller 300, as will be described below. Specifically, in the suspension system 800, damping force of a damper may be controlled according to control signals of the controller 300. In addition, the suspension system 800 may be used not only for general suspension control for driving comfort and steering stability but also for control of various positions of the vehicle 1, such as anti-roll control, anti-squat control, anti-dive control, etc, An input unit 400 may receive an external command to select a traveling mode. The traveling mode herein may refer to a mode for controlling the vehicle 1 according to traveling parameters determined in advance for the vehicle 1 to perform a special purpose of driving, and the traveling parameters may refer to setting values to determine operations of all components related to driving. For example, the traveling parameters may include output values of the driving unit 700 to be sent to the wheels 21, 22, and/or output values of the suspension system 800. If the driver selects a traveling mode that suits a desired purpose from a plurality of traveling modes, the vehicle 1 may be controlled according to the traveling parameter corresponding to the selected traveling mode.

The traveling mode may be determined depending on various purposes, but in the following description, it is assumed for convenience of explanation that the traveling modes include a Smart mode for normal driving, a Sport mode for dynamic driving, and an ECO mode for low fuel consumption.

The input unit 400 of FIG. 3 may include any means inside the vehicle 1 for receiving control commands, such as the dial controller 122 as described in connection with FIG. 2, control devices 142*a*, 142*b* equipped on the steering wheel 140.

The controller 300 may control traveling of the vehicle 1 according to a traveling mode selected by an input. Specifically, the controller 300 may determine a traveling parameter corresponding to the selected traveling mode, and control at least one of the driving unit 700 or the suspension system 800 according to the determined traveling parameter.

For example, if the ECO mode is selected, the controller 300 may suppress sudden rise in rotation of the driving unit 700 according to a determined traveling parameter and change speed at a point when the vehicle 1 is able to operate with the lowest fuel consumption. The controller 300 may also control the suspension system 800 to control Continuous Damping Control (CDC) or change Motor Driven Power Steering characteristics according to a determined traveling parameter, The controller 300 may also determine an ADAS setting parameter using the driver's driving pattern and the selected traveling mode. For this, the controller 300 may determine the driver's driving pattern using traveling information sent from the sensor unit 200.

The sensor unit 200 may detect and send traveling information to the controller 300. The traveling information may include all information relating to the vehicle 1 on the move or not on the move, and surrounding information around the vehicle 1, based on which the driver's driving pattern may be determined.

For this, the sensor unit 200 may include a car speed sensor 210 for detecting a traveling speed of the vehicle 1, a steering wheel sensor 220 for detecting operation of the steering wheel, an accelerator pedal sensor 230 for detecting a position of the accelerator pedal, and a brake pedal sensor 240 for detecting a position of the brake pedal. In addition, although not shown in FIG. 3, the sensor unit 200 may include a means for detecting various traveling information, such as a kick-down switch for detecting kick down and an engine rotation speed sensor for detection rotation of the engine of the driving unit 700.

The controller 300 may determine a driving pattern by quantifying the traveling information detected by the sensor unit 200. The driving pattern may be represented in numerical values. A method for determining the driving pattern will now be described in connection with FIG. 4.

Figure 4:
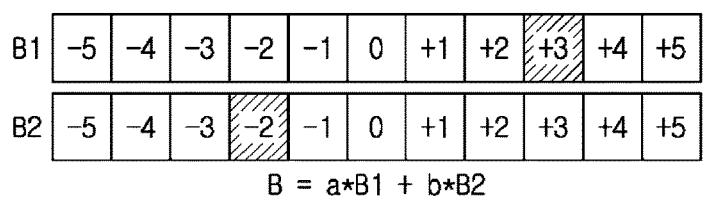

FIG. 4 shows how a controller determines the driving pattern, according to one form of the present disclosure. For convenience of explanation, it is assumed that traveling information received by the controller 300 is comprised of a steering wheel angle and an accelerator/brake pedal position.

The controller 300 may quantify the traveling information, and determine a driving pattern to be a value corresponding to the traveling information quantified in a predetermined range. In FIG. 4, the driving pattern is determined to be an integer in a range from −5 to 5, in which case '0' is a reference.

Referring to FIG. 4, the controller 300 may determine a steering wheel angle change pattern B1 to be '3' by accumulating changes in steering wheel angle received by the controller 300. Since B1 is 3, which is greater than '0', it means that the driver is changing the steering wheel angle more frequently than usual (reference).

The controller 300 may also determine an accelerator/brake pedal operating pattern B2 to be '−2' by accumulating received information about positions of the accelerator/brake. Since B2 is '−2', which is less than '0', it means that the driver is making a burst of speed and/or sudden braking while driving the vehicle 1 more frequently than usual (reference).

Finally, the controller 300 may obtain the driving pattern B by combining B1 and B2. The controller 300 may combine B1 and B2 by weighing them depending on the importance of the respective traveling information. Referring to FIG. 4, the controller 300 may apply weight a to B1 and weight b to B2, and then combine the weighted B1 and B2. The weights a and b may be positive integers.

The final B generated by the controller 300 may have a sign. According to the aforementioned method, since '0' is the reference, the driver's driving pattern may be represented by the sign and magnitude of B. Specifically, if the sign of B is positive, it means that the driver is actually performing dynamic driving, and if the sign of B is negative, it means that the driver is actually performing defensive driving, in which case the magnitude of B means an extent of the dynamic or defensive driving.

Once the driving pattern is determined, the controller 300 may determine an ADAS setting parameter based on the traveling mode and the driving pattern. The controller 300 may determine the ADAS setting parameters for the respective ADAS modules 500.

On the other hand, the controller 300 may select an ADAS mode corresponding to a traveling mode and a driving pattern, and then comprehensively determine the ADAS setting parameters for the plurality of ADAS modules 500 according to the selected ADAS mode. The relations between ADAS modes and corresponding ADAS setting parameters will now be described in connection with FIG. 5.

FIG. 5 illustrates the relations between ADAS modes and the ADAS setting parameters, according to one form of the present disclosure. It will be described under assumption that ADAS modes include a Swagger mode, an Usual mode, a Destress mode, and a Nervous mode. It is, however, explained only as an example, and the ADAS modes are not limited thereto.

The ADAS modes may be divided into sub-modes: first ADAS modes and second ADAS modes. The first ADAS modes may refer to modes suitable for a driver who favors and performs more dynamic driving than usual, and the second ADAS modes may refer to modes suitable for a driver who favors and performs more defensive driving than usual.

Specifically, the first ADAS modes may include the Swagger mode suitable for a driver who favors and performs dynamic driving and the Usual mode suitable for a driver who favors and performs normal driving, and the second ADAS modes may include the Destress mode suitable for a driver who favors and performs relatively defensive driving and the Nervous mode suitable for a driver who favors and performs the excessively defensive driving.

A plurality of parameters for the respective ADAS modes may be determined in advance. Referring to FIG. 5, in the Swagger mode, operating points of the AEB module 510 and/or FCW module 520, in particular, a point of warning of collision with an object ahead and/or a point of deceleration to avoid collision with an object ahead may be determined to be later than a threshold point in time. In the Swagger mode, it is also determined to activate the LDW module 530 to warn of lane departure while deactivating the LKA module 540. In addition, in the Swagger mode, an operating point of the BSD module 550, in particular, a point of warning of collision with an object behind or to a side of the vehicle 1 may be determined to be later than a threshold point, time for acceleration to a target speed of the SCC module 560 may be determined to be faster than a threshold time, and a safe distance to a vehicle in advance may be determined to be shorter than a threshold distance.

Furthermore, in the Destress mode, operating points of the AEB module 510 and/or FCW module 520, in particular, a point of warning of collision with an object ahead and/or a point of deceleration to avoid collision with an object ahead may be determined to be earlier than a threshold point in time. In the Destress mode, it is also determined to deactivate the LDW module 530 but to activate the LKA module 540 to perform repulsive control. In addition, in the Destress mode, an operating point of the BSD module 550, in particular, a point of warning of collision with an object behind or to a side of the vehicle 1 may be determined to be a threshold point, time for acceleration to a target speed of the SCC module 560 may be determined to be slower than a threshold time, and a safety distance to a vehicle ahead may be determined to be longer than a threshold distance.

Besides, respective ADAS setting parameters may be determined in advance to correspond to the Usual mode and the Nervous mode, according to what is shown in FIG. 5. It is, however, explained only as an example, and the relations between ADAS modes and ADAS setting parameters are not limited to what is shown in FIG. 5.

The controller 300 may determine the ADAS setting parameters by selecting one of the plurality of ADAS modes having the aforementioned relations, which corresponds to the traveling mode and the driving pattern. A method for determining the ADAS setting parameters will now be described in connection with FIG. 6.

FIG. 6 shows how a controller determines the ADAS setting parameters, according to one form of the present disclosure. In FIG. 6, let a traveling mode selected by an input be 'A', a driving pattern be 'B', and an ADAS mode be 'C'. 'N' refers to the Nervous mode, 'D' refers to the Destress mode, 'U' refers to the Usual mode, and 'S' refers to the Swagger mode.

If the Sport mode A2 is selected by an input of the driver, the controller 300 may select one of the first ADAS modes. Since the Sport mode is for the driver who favors dynamic driving, the controller 300 may exclude the second ADAS modes that are for the driver who favors defensive driving.

The controller 300 may then select one of the Usual mode and the Swagger mode based on the sign of the driving pattern B determined according to the method described in connection with FIG. 4. Specifically, if B is a positive number, it means that the driver is performing more dynamic driving than usual, and the controller 300 may thus select the Swagger mode for ADAS mode. On the other hand, if B is a negative number, it means that the driver is performing more defensive driving than usual, and the controller 300 may thus select the Usual mode for ADAS mode.

Alternatively, if the ECO mode A3 is selected by an input of the driver, the controller 300 may select one of the second ADAS modes. Since the ECO mode is for the driver who favors driving with low fuel consumption, the controller 300 may exclude the first ADAS modes that are for the driver who favors dynamic driving.

The controller 300 may then select one of the Nervous mode and the Destress mode based on the sign of the driving pattern B determined according to the method described in connection with FIG. 4. Specifically, if B is a positive number, it means that the driver is performing more dynamic driving than usual, and the controller 300 may thus select the Destress mode for ADAS mode. On the other hand, if B is a negative number, it means that the driver is performing more defensive driving than usual, and the controller 300 may thus select the Nervous mode for ADAS mode.

Alternatively, if the Smart Mode A1 is selected by an input of the driver, the controller 300 may select one of the whole ADAS modes including the first and second ADAS modes. Since the Smart mode is for the driver who favors normal driving, one of the whole ADAS modes may be selected. In this regard, the controller 300 may select one of the ADAS modes based on the sign and magnitude of B.

Once an ADAS mode is determined according to the aforementioned method, an ADAS setting parameter may also be determined to correspond to the ADAS mode. The controller 300 may control the ADAS module 500 according to the determined ADAS setting parameter, and the ADAS module 500 controlled by the controller 300 may perform a function desired for the driver.

Turning back to FIG. 3, the display 600 may display setting information for the determined ADAS setting parameter. The setting information herein may include not only the determined ADAS setting parameter but also an ADAS mode corresponding to the determined ADAS setting parameter.

For this, the display 600 may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), etc., without being limited thereto.

The display 600 may include any means for displaying the setting information inside the vehicle 1, and include the cluster and GPS as described above in connection with FIG. 2.

Figure 7A:
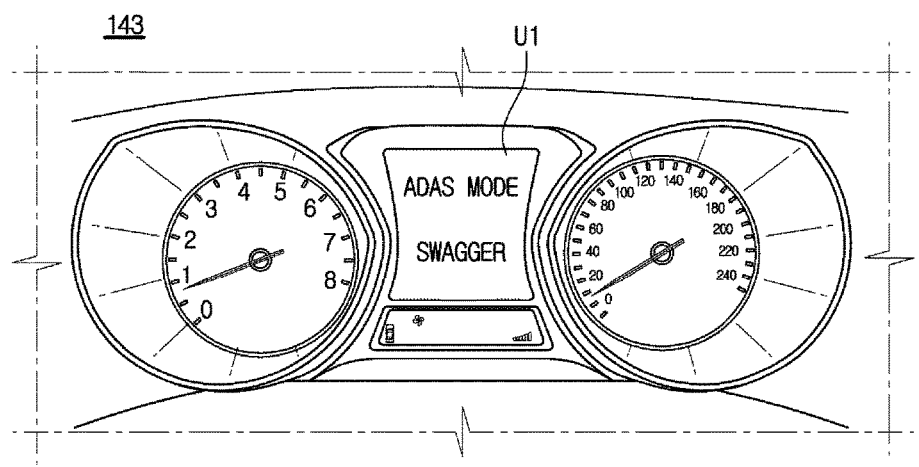
FIGS. 7A and 7B illustrate a displaying method of a display.
Figure 7B:
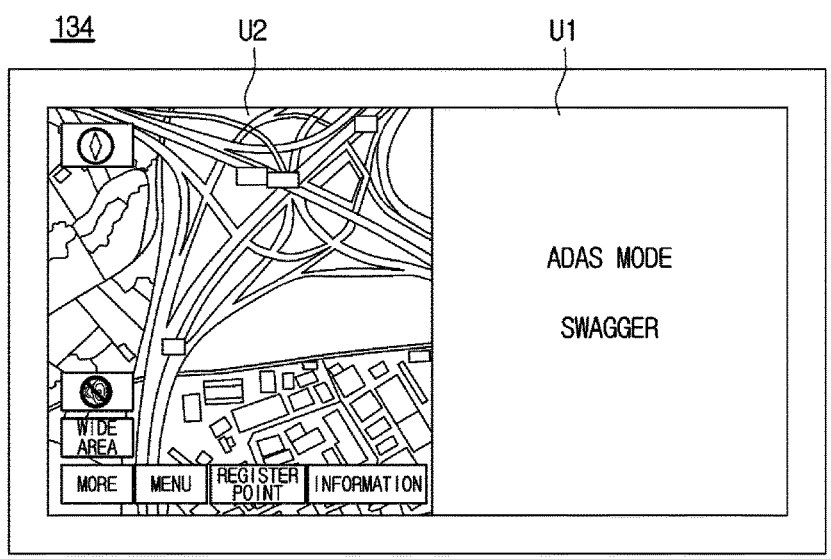

FIG. 7A illustrates a displaying method of a display, according to one form of the present disclosure, and FIG. 7B illustrates a displaying method of a display, according to another form of the present disclosure.

In FIG. 7A, the cluster of the vehicle 1 displays an ADAS mode selected for the setting information. Referring to FIG. 7A, the cluster may display an ADAS mode U1 between the speed gauge and the rpm gauge on either sides. With the display, the driver may check the automatically selected ADAS mode with his/her eyes and predict a subsequent traveling control of the vehicle 1.

In FIG. 7B, the GPS of the vehicle 1 displays an ADAS mode selected for the setting information. Referring to FIG. 7B, the GPS may divide the screen to display the ADAS mode U1 along with a map U2 that has been displayed. With the display, the driver may check the selected ADAS mode with his/her eyes without discontinuities in GPS information that has been offered.

In the meantime, the driver who checks the traveling information through the display 600 may input a command to change the ADAS setting parameter through the input unit 400. For example, if the driver who checks the traveling information of FIG. 7A tries to perform normal driving, he/she may directly change the ADAS setting parameter by an input.

The vehicle 1 in accordance with one form of the present disclosure may automatically determine an ADAS setting parameter based on the selected traveling mode and the actual driving pattern of the driver, thereby increasing ADAS usability of the driver. By visually providing the determined result to the driver, the vehicle 1 may also help the driver predict and prepare for the subsequent traveling control.

Figure 8:
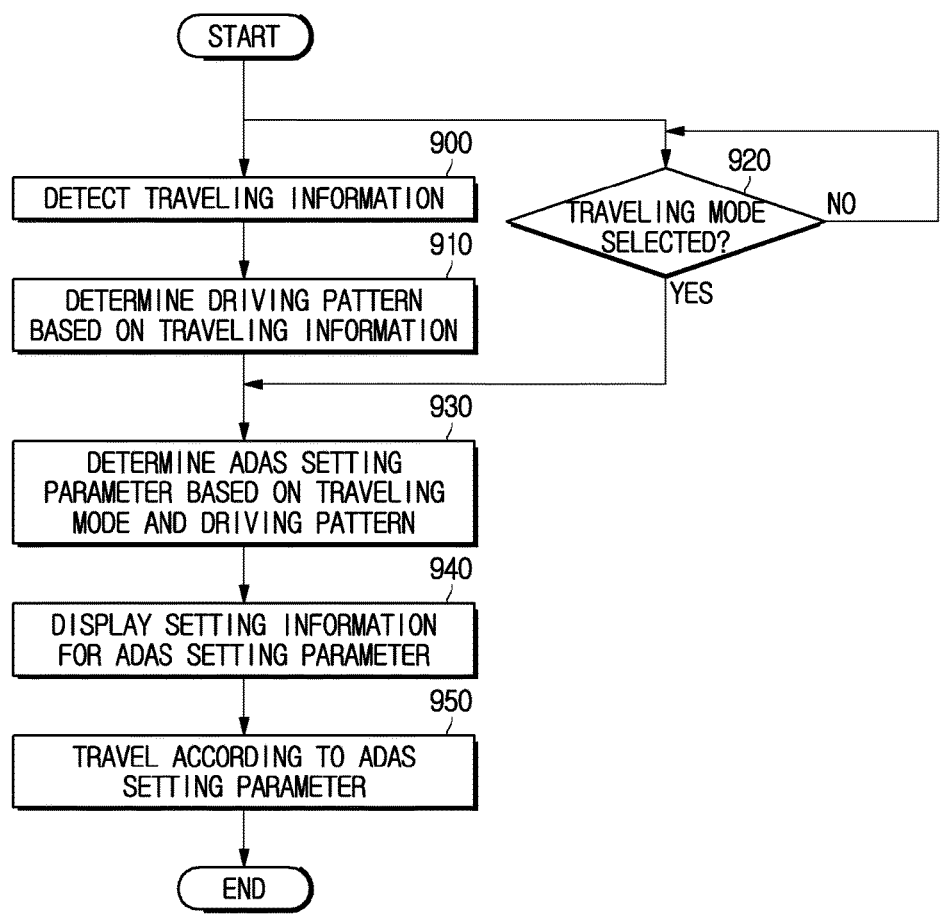
FIG. 8 is a flowchart illustrating a method for controlling a vehicle.

FIG. 8 is a flowchart illustrating a method for controlling a vehicle, according to one form of the present disclosure.

First, the vehicle 1 detects traveling information, in 900. The traveling information may include all information relating to the vehicle 1 on the move or not on the move, and surrounding information around the vehicle 1, based on which the driver's driving pattern may be determined.

Specifically, the traveling information to be detected by the vehicle 1 may include a traveling speed of the vehicle 1, operation of the steering wheel, position of the accelerator pedal, position of the brake pedal, whether kick-down has been made, rotation of the engine, etc.

Next, the vehicle 1 determines the driving pattern based on the detected traveling information, in 910. Specifically, the vehicle 1 may determine the driving pattern by quantifying the detected traveling information. The driving pattern may be represented in numerical values.

Simultaneously, the vehicle 1 determines whether a traveling mode has been selected, in 920. The traveling mode herein may refer to a mode to control the vehicle 1 according to a traveling parameter determined in advance for the vehicle 1 to perform a special purpose of traveling. The traveling mode may be selected by an input of the driver. If no traveling mode is selected, the vehicle 1 may repeatedly check until a traveling mode is selected.

If a traveling mode is selected and a driving pattern is determined, the vehicle 1 determines an ADAS setting parameter based on the selected traveling mode and the determined driving pattern, in 930. In this regard, the vehicle 1 may determine the ADAS setting parameters depending on the traveling modes and the driving patterns, or may select an ADAS mode based on the traveling mode and the driving pattern and simultaneously, determine the ADAS setting parameter corresponding to the selected ADAS mode.

The vehicle 1 then displays setting information for the determined ADAS setting parameter, in 940. The setting information may include the ADAS setting parameter and corresponding ADAS mode.

Finally, the vehicle 1 travels according to the determined ADAS setting parameter, in 950. Specifically, the ADAS module 500 of the vehicle 1 may provide various functions for the driver according to the ADAS setting parameter.

According to forms of the present disclosure, an ADAS module may be automatically controlled based on the driver's intention and traveling pattern.

Furthermore, setting information relating to automatic control of the ADAS module may be displayed to provide the driver with ADAS setting information.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
an input device configured to receive a command to select a traveling mode;
a plurality of sensors configured to detect traveling information;
a controller configured to determine a driving pattern of a driver by quantifying the detected traveling information, the driving pattern being represented in numerical value having a sign and magnitude and select one of a plurality of Advanced Driver Assistance System (ADAS) modes based on the selected traveling mode and the sign of the driving pattern or select one of the plurality of ADAS modes based on the selected traveling mode and the sign and the magnitude of the driving pattern, and determine at least one ADAS setting parameter corresponding to the selected ADAS mode; and
a display configured to display setting information regarding the determined ADAS setting parameter.

2. The vehicle of claim 1, wherein the controller is configured to determine a traveling parameter based on the selected traveling mode.

3. The vehicle of claim 2, further comprising:
a driving device configured to provide power to move the vehicle; and
a suspension system configured to absorb external force applied during traveling,
wherein the controller is configured to control the driving device and the suspension system according to the determined traveling parameter.

4. The vehicle of claim 1, wherein the plurality of sensors is configured to detect the traveling information based on at least one of a position of an accelerator pedal, a position of a brake pedal, a traveling speed, or a steering angle.

5. The vehicle of claim 1, wherein the controller is configured to determine the ADAS setting parameter including at least one of a point of warning of collision with an object ahead, a point of deceleration to avoid collision with the object ahead, a method for preventing lane departure, a point of warning of collision with an object behind or to a side of the vehicle, time for acceleration to a target speed, or a safety distance to a vehicle ahead.

6. The vehicle of claim 1, wherein the controller is configured to select one of first ADAS modes corresponding to a first traveling mode according to the driving pattern, when the first traveling mode is selected.

7. The vehicle of claim 1, wherein the controller is configured to select one of second ADAS modes corresponding to a second traveling mode according to the driving pattern, when the second traveling mode is selected.

8. The vehicle of claim 1, further comprising:
at least one ADAS module operating according to the determined ADAS setting parameter.

9. The vehicle of claim 1, wherein the controller quantifies a first parameter B1 and a second parameter B2, and assigns a first weight a to the first parameter B1 and a second weight b to the second parameter B2, such that the numerical value of the driving pattern is represented by B in the equation B=a*B1+b*B2.

10. The vehicle of claim 9, wherein the first parameter B1 is steering wheel angle, and the second parameter B2 is accelerator or brake position.

11. A method for controlling a vehicle, the method comprising:
receiving, by an input device, a command to select a traveling mode;
detecting traveling information;
determining a driving pattern of a driver by quantifying the detected traveling information, the driving pattern being represented in numerical value having a sign and magnitude;
selecting, by a controller, one of a plurality of Advanced Driver Assistance System (ADAS) modes based on the selected traveling mode and the sign the driving pattern or selecting, by the controller, one of the plurality of ADAS modes based on the selected traveling mode and the sign and the magnitude of the driving pattern;
determining a traveling parameter based on the selected traveling mode;
performing at least one of operations of providing power to move the vehicle according to the determined traveling parameter, or absorbing external force applied during traveling according to the determined traveling parameter;
determining at least one ADAS setting parameter corresponding to the selected ADAS mode; and
displaying setting information regarding the determined ADAS setting parameter.

12. The method of claim 11, wherein detecting the traveling information comprises:
detecting the traveling information based on at least one of a position of an accelerator pedal, a position of a brake pedal, a traveling speed, or a steering angle.

13. The method of claim 11, wherein determining the ADAS setting parameter comprises:
determining the ADAS setting parameter including at least one of a point of warning of collision with an object ahead, a point of deceleration to avoid collision with the object ahead, a method for preventing lane departure, a point of warning of collision with an object behind or to a side of the vehicle, time for acceleration to a target speed, or a safety distance to a vehicle ahead.

14. The method of claim 11, wherein selecting one of a plurality of ADAS modes comprises:
   selecting one of first ADAS modes that corresponds to a first traveling mode according to the driving pattern, when the first traveling mode is selected.

15. The method of claim 11, wherein selecting one of a plurality of ADAS modes comprises:
   selecting one of second ADAS modes that corresponds to a second traveling mode according to the driving pattern, when the second traveling mode is selected.

16. The method of claim 11, further comprising:
   traveling according to the determined ADAS setting parameter.

17. The method of claim 11, wherein quantifying the detected traveling information comprises quantifying a first parameter $B1$ and a second parameter $B2$, and assigning a first weight a to the first parameter $B1$ and a second weight b to the second parameter $B2$, such that the numerical value of the driving pattern is represented by B in the equation $B=a*B1+b*B2$.

18. The method of claim 17, wherein the first parameter $B1$ is steering wheel angle, and the second parameter $B2$ is accelerator or brake position.

* * * * *